(12) United States Patent
Peters et al.

(10) Patent No.: US 6,370,274 B1
(45) Date of Patent: Apr. 9, 2002

(54) METHOD OF STORING IN CODED FORM IMAGE INFORMATION OF MOVING IMAGES, DIAGNOSTIC SYSTEM USING THE METHOD, AND IMAGE CODING AND RECORDING UNIT AND IMAGE-INFORMATION RETRIEVAL UNIT FOR USE IN SUCH A SYSTEM

(75) Inventors: Joseph H. Peters; Petrus C. G. Van Der Hijden, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 08/294,129

(22) Filed: Aug. 22, 1994

(30) Foreign Application Priority Data

Oct. 14, 1993 (BE) ............................................ 09301087
Nov. 15, 1993 (EP) ............................................ 93203173

(51) Int. Cl.$^7$ .................................................. G06K 9/36
(52) U.S. Cl. ...................................... 382/234; 382/236
(58) Field of Search ................................ 382/234, 236, 382/233, 132, 128; 348/397, 398, 400, 402, 220

(56) References Cited

U.S. PATENT DOCUMENTS 5,144,424 A * 9/1992 Savatier ...................... 358/133
5,235,421 A * 8/1993 Yang .......................... 348/398

(List continued on next page.)

FOREIGN PATENT DOCUMENTS

| EP | 0507403 | 10/1992 |
| JP | 1243184 | 9/1989 |

(List continued on next page.)

OTHER PUBLICATIONS

"A Videodisc Recorder for Broadcast Use" R. Bauarschi Et Al, SMPTE Journal, vol. 102, No. 7, Jul. 1993, pp. 612–615.

(List continued on next page.)

Primary Examiner—Yon J. Couso

(57) ABSTRACT

A diagnostic system includes an image acquisition unit (1), an image coding and recording unit (2) and an image information retrieval unit (9). The image acquisition unit (1) acquires moving-image information relating to an object (3) to be examined which information represents a series of images that succeed one another in time. The image coding and recording unit (2) includes a first coding unit (4) for converting the series of images into a first data stream in accordance with first conversion rules optimised for the compression of moving-image information, and a second coding unit (6) for converting the series of images into a second data stream in accordance with second conversion rules optimized for the compression of still-image information. The average amount of information per coded image is smaller for the first coding unit (4) than for the second coding unit (6). The image coding and recording unit (2) further includes a recording unit (7) for recording the first and the second data streams on one and the same record carrier. The image information retrieval unit (9) includes a read unit (10) for reading the data streams from the record carrier (8), a control unit (17), a first decoding unit (12) for recovering the image information from the first data stream, a second decoding unit (13) for recovering the image information from the second data stream, and an image output unit (16) for supplying recovered images to an image reproducing device. The control unit (17) controls the read unit (10), the first and the second decoding units (12 and 13), and the image output unit (15). In a first mode the readout a part of the recorded first data stream, the recovery of the corresponding moving-image information by the first decoding unit and the supply of recovered moving-image information to an image reproducing unit (14) are effectuated. In a second mode the read-out of a selected part of the second data stream, the recovery of the corresponding still-image information by the second decoding unit (13) and the supply of this recovered image information to the image reproducing unit (14) are effectuated.

37 Claims, 3 Drawing Sheets

U.S. PATENT DOCUMENTS

| | | | | |
|---|---|---|---|---|
| 5,243,428 A | * | 9/1993 | Challapali et al. | 358/167 |
| 5,262,875 A | * | 11/1993 | Mincer et al. | 358/335 |
| 5,267,334 A | * | 11/1993 | Normille et al. | 382/236 |
| 5,390,159 A | | 2/1995 | Schylander | 369/48 |
| 5,444,482 A | * | 8/1995 | Misawa et al. | 348/220 |

FOREIGN PATENT DOCUMENTS

| | | |
|---|---|---|
| WO | 9108648 | 6/1991 |
| WO | 9205651 | 4/1992 |

OTHER PUBLICATIONS

"The MPEG Video Compression Algorithm" D. Le Gall, Signal Processing, Image Communication 4 (1992) pp. 129–140.

"MPEG a Video Compression Standard for Multimedia Applications", D. Le Gall Apr. 1991.

"The Full Motion System for CD–I" Jan Van Der Meer, IEEE Transactions on Consumer Electronics, vol. 38, No. 4 Nov. 1992, pp. 910–920.

* cited by examiner

METHOD OF STORING IN CODED FORM IMAGE INFORMATION OF MOVING IMAGES, DIAGNOSTIC SYSTEM USING THE METHOD, AND IMAGE CODING AND RECORDING UNIT AND IMAGE-INFORMATION RETRIEVAL UNIT FOR USE IN SUCH A SYSTEM

BACKGROUND OF THE INVENTION

1. Field of the Invention

The invention relates to a method of storing image information in coded form representing a series of images which succeed one another in time.

The invention also relates to a diagnostic system using the method.

The invention further relates to an image coding and recording unit and an image information retrieval unit for use in such a system.

2. Description of the Related Art

The storage of image information representing moving images or pictures is known from the SMPTE Journal, Volume 102, No. Jul. 7, 1993, pp. 612–615. Such a method can be used, for example, in so-called cardiovascular diagnosis where cardiac function is studied by introducing a contrast medium into a blood vessel of the heart and subsequently malting a series of radiographs to record how this contrast medium propagates in the blood vessels of the heart as a function of time. The series of images obtained by means of the radiographs are converted into coded data streams which are subsequently recorded on a suitable record carrier, for example in the form of a magnetic or optical tape or disc. The image information thus recorded is read out and displayed at a later instant to analyze the cardiac function. This analysis is effected y examining moving images resulting from displaying the series of images in succession and if close scrutiny of the one or more individual images of the series is required, they are displayed as stationary or still images. For this purpose it is desirable that each of the individual images can be displayed selectively as a still image, enabling both preceding images in the series and subsequent images to be selected. For a correct diagnosis it is desirable that the images recovered from the coded information read from the record carrier are of the same quality as the originally recorded images. This means that the amount of information to be read out per image is large and, consequently, the data rate (amount of information per unit of time) with which the information is read should be high. This high data rate (hereinafter also referred to as "read velocity") imposes stringent requirements on the read devices by means of which the image information is read.

SUMMARY OF THE INVENTION

It is an object of the invention to provide a method by means of which, on the one hand, the image information is recorded in such a manner that a rapid and reliable analysis of the image information is possible and for which, on the other hand, the data rate with which the image information is read is limited.

This object is achieved by means of a method of recording in coded form on a record carrier image information relating to moving images for the purpose of further analysis at a later instant, the image information representing moving images in the form of a series of images which succeed one another in time, said series of images being converted into a first data stream in which each of the series of succeeding images is represented, which first data stream is subsequently recorded on the record carrier, characterized in that the series of images is converted into a second data stream in which each image of the series is represented likewise, the average amount of information per image in the first data stream being smaller than in the second data stream, and the second data stream being recorded on the record carrier together with the first data stream.

The method in accordance with the invention advantageously utilizes the fact that other requirements are imposed on the reproduction of moving images than on the reproduction of still images. For example, for the reproduction of moving images it is essential that the rate at which the successive images of the series are reproduced is high enough to achieve an impression of non-intermittent motion. In general, the image quality is considered to be less important for moving images than for still images. Conversely, the rate at which successive images can be reproduced is less important for the reproduction of still images. With a given limited read velocity of a read device the recording of the two data streams has enabled the moving images to be coded by a coding method which to an optimum extent meets the requirements imposed on the reproduction of moving images, the recording of the second data stream yet enabling each individual image to be reproduced with a high quality. The fact that the time required to read out the information relating to the still image to be displayed is longer than the time between successive images during the reproduction of moving images does not pose a problem provided that it remains within acceptable limits.

It is to be noted that JP-A-1-243184 discloses a device for displaying image information. Moving image information in the form of a series of time sequential images are stored in irreversibly compressed form in a RAM. In addition, for some of the images of a series of successive images representing the moving pictures a reversibly compressed image is stored in the RAM. For the reproduction of moving the irreversibly compressed images of a series of successive images are read out, expanded and subsequently applied to an display device. For the reproduction of a still image a reversibly compressed image is read out, expanded and applied to the display device. With the disclosed device a reversibly compressed image is available only for a very limited number of images of the series of successive images representing the moving pictures and therefore the device is not suitable for the thorough analysis of image information as required, for example, in cardiac function analysis. Indeed, for this analysis a high-quality still image is required for each of the images of the series of images forming the moving images.

An embodiment of the method is characterized in that reference information is recorded on the record carrier, which reference information is indicative of the locations where corresponding images are situated in the first and the second data stream.

This embodiment has the advantage that during the analysis which follows an interruption in the reproduction of the moving image the associated high-quality coded image in the second data stream can be located rapidly on the basis of the reference information.

An embodiment of the method is characterized in that the conversion of the series of images in the first data stream is of a type in which images of the series are coded by coding differences between the relevant image and another image of the series, each image in the second data stream being represented by a separately coded image which has been coded independently of the image information of other images of the series.

This embodiment has the advantage that as result of the redundance in the successive images a high degree of compression and, consequently, a low required read velocity can be obtained while preserving a satisfactory image quality. In this case the disadvantage of such compression techniques that arbitrary images cannot simply be retrieved does not play a part owing to the availability of the second data stream. Another disadvantage that the reproduced images based on the first data stream exhibit distortion, i.e. quantization noise, is also of minor importance because such imperfections are considered to be less annoying in the case of moving images and because any individual image can be reproduced without distortion owing to the presence of the second data stream. A particularly suitable image coding for obtaining the first data stream is the so-called MPEG coding.

A further embodiment of the method is characterized in that the series of images is also converted into a third data stream in which each image of the series is represented, the average amount of information per image in the third data stream being smaller than in the first data stream.

The record carrier obtained by means of this embodiment enables moving images to be reproduced smoothly by means comparatively simple and, consequently, cheap read devices which read the third data stream with a low read velocity. The quality of the images reproduced on the basis of the third data stream is of a lower grade than that of images based the first and the second data stream but often the interpretation of the images does not require image reproduction with the highest quality. In many cases it is adequate to reproduce images with a lower quality. For example, when the cardiac function is discussed with another physician it is often adequate to display the image information with a lower resolution.

Since the resulting record carrier permits of high quality reproduction by means of advanced read devices and lower quality reproduction by means of cheaper read devices the use of sophisticated expensive read equipment can be restricted to those cases requiring the high image quality.

Moreover, it is to be noted that the record carrier area occupied by the lower quality image information is small in comparison with the area needed for the storage of the high quality images, so that the total amount of image information which can be recorded on a record carrier is reduced only slightly as result of the storage of the lower quality images.

A further embodiment of the method is characterized in that the series of images is also converted into a fourth data stream, each image being separately coded independently of the image content of the other images of the series, the average amount of information per image in the fourth data stream being smaller than in the second data stream, and the fourth data stream being recorded on the record carrier together with the first, the second and the third data stream.

This enables both moving images and still images to be reproduced by means of less expensive read equipment in a similar way as by means of sophisticated read equipment.

It is particularly attractive to code and record the lower quality moving images and the associated still images in accordance with a format which complies with the so-called CD-I standard. This enables the lower quality images to be reproduced by means of a cheap mass product developed for the consumer market.

In addition to the audiovisual information a CD-I should contain an application program which controls the access to the stored information during the read process. By adapting this application program so as to prevent the CD-I player from reading information not coded in accordance with the CD-I standard the recording of the higher quality images on a CD-I will have no consequences for the read-out of the CD-I disc by a CD-I player.

The read device for reading the higher resolution image information may be provided with a control system which enables the files with higher resolution image information to be read.

During an examination of the cardiac function the image information is generally obtained in a number of so-called runs. The length of a run is determined by the time required by the contrast medium to propagate in the blood vessels of the heart. This time is of the order of magnitude of ten seconds.

An embodiment of the method which is particularly suitable for use in the above-mentioned conditions is characterized in that at least the first and the second data stream, which have been derived from a continuous series of images, are recorded in a continuous part of the record carrier. Since with this embodiment the information relating to the moving images as well as the information relating to the still images for one run are recorded together the search time upon a change from moving image reproduction to still image reproduction (or vice versa) is short.

A further embodiment is characterized in that for each continuous series of images a first part of the second data stream is recorded in such a way that it directly precedes the first data stream and a second part of the second data stream is recorded in such a way that it directly follows the first data stream.

This embodiment has the advantage that if it is desired to read a still image during the read-out of moving images the distance to the new the read location will only be minimal, which results in a short access time.

The method in accordance with the invention can be used advantageously in a diagnostic system comprising means for acquiring image information relating to an object to be examined, which image information comprises a series of images which succeed one another in time, an image coding and recording unit comprising first coding means for converting the series of images which succeed one another in time into a first data stream in which each of the series of succeeding images is represented, and second coding means for converting the image information into a second data stream in which each image of the series is represented likewise, the average amount of information per image in the first data stream being smaller than in the second data stream, and the image coding and recording unit further comprising a recording device for recording the first and the second data stream on one and the same record carrier, an image information retrieval unit of a first type comprising read means for reading the record carrier with a first read velocity, first decoding means for recovering successive images from the first data stream, second decoding means for recovering individual images from the second data stream, and image output means for supplying recovered images to an image reproducing device, control means for controlling the read means, the first and the second decoding means and the image output means, which control means are adapted to achieve that in a first mode a part of the recorded first data stream is read, a series of images corresponding to the read-out part is recovered by the first decoding means and said recovered images are supplied by the image output means, and the control means are further adapted to achieve that in a second mode a selected separately coded image of the second data stream is read, an image corresponding thereto is recovered from said coded image by the second decoding means and said recovered image is supplied by the image output means.

BRIEF DESCRIPTION OF DRAWINGS

The invention will now be described in more detail with reference to FIGS. 1 to 6, in which.

DETAILED DESCRIPTION OF THE PREFERRED EMBODIMENTS

Figure 1:
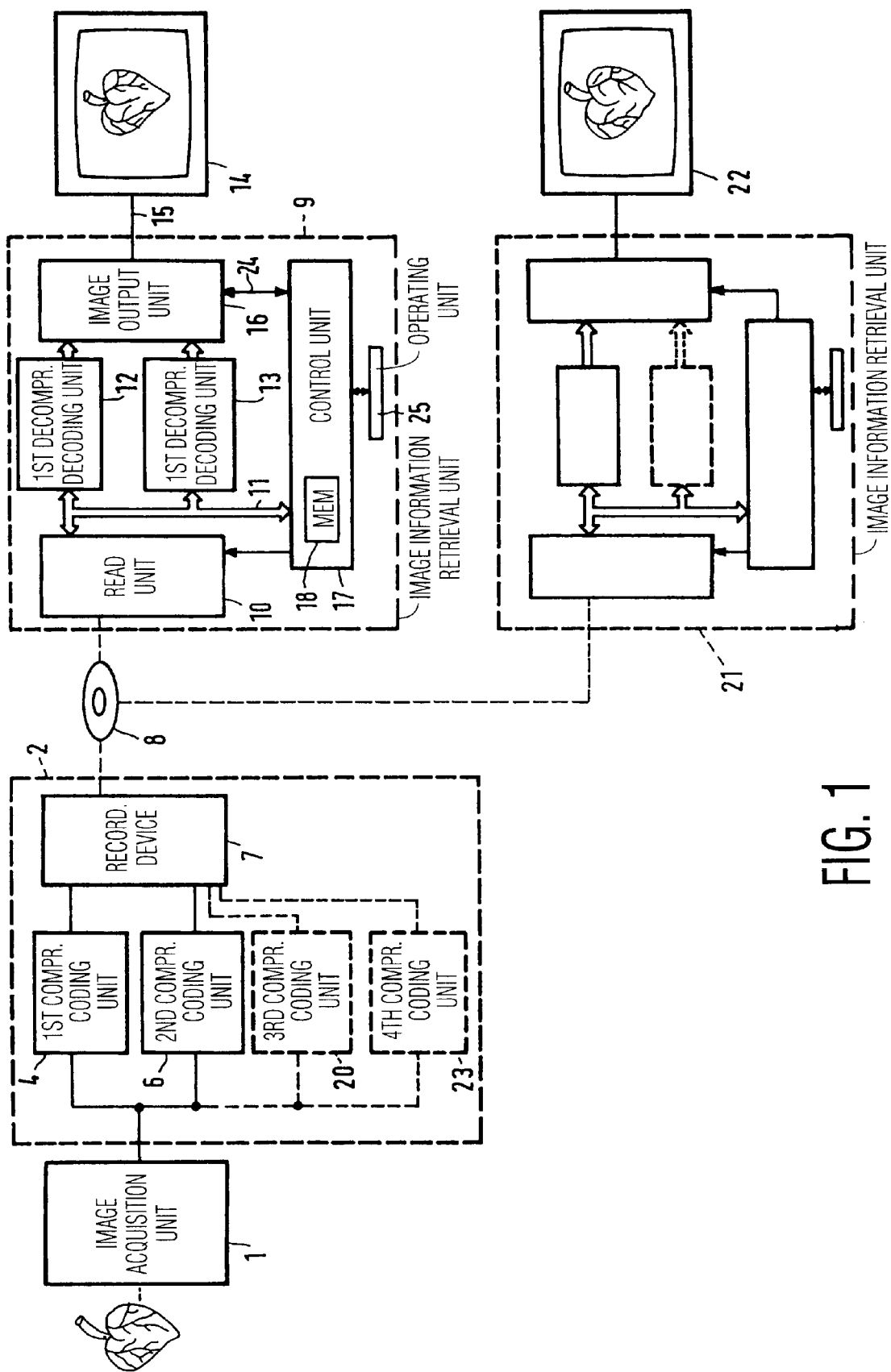
FIG. 1 shows an embodiment of a diagnostic system in accordance with the invention.

FIG. 1 shows an embodiment of a diagnostic system in accordance with the invention. In the present embodiment the reference numeral 1 denotes customary means for acquiring moving-image information relating to an object 3 to be examined. Such means, referred to hereinafter as an image acquisition unit, may comprise customary X-ray imaging equipment for making a series of X-ray exposures of the vascular system of a human or animal heart into which a contrast medium has been introduced, which exposures succeed one another at fixed time intervals of, for example 40 ms. Such X-ray imaging equipment may include a TV camera for picking up an image formed on an X-ray image intensifier. The X-ray imaging equipment may also include a pick-up device for the direct electronic conversion and storage of the X-ray image. However, other image acquisition units for picking up a time sequential series of images other than X-ray images are also possible. Image signals representing the acquired series of images are applied to an image coding and recording unit 2.

If the image acquisition unit 1 picks up X-ray images the image signals may comprise digital signals representing monochrome pictures formed by a matrix of pixels, for example 512×512 pixels, the image signal for each pixel comprising a luminance value indicating the intensity level of the relevant pixel.

The image coding and recording unit 2 comprises a first coding unit 4 for converting the series of images represented by the image signals into a first data stream comprising a representation of each image of the series. The coding unit 4 is of a customary type adapted to compress moving images. An important requirement imposed on such compression techniques is a low average quantity of information per image. This is in order to minimize the amount of information to be transmitted per unit of time and, consequently, the required transmission bandwidth. For the reproduction of moving images the image quality of the individual images is less important because faults in the individual images during the reproduction of moving images are less conspicuous in comparison with faults in a reproduced still image. As a result of this lower image quality the data stream obtained by means of a compression technique which has been optimized for the transmission of moving images is therefore not suitable for the recovery of a high-quality still image. Yet, to enable a high-quality still image to be reproduced, a second data stream is recorded on the record carrier, from which a high-quality still image can be recovered for each image of the series. To derive this second data stream the image coding and recording unit 2 comprises a second coding unit 6 for converting the series represented by the image signals into the second data stream. The coding unit 6 is of a customary type optimized for encoding still images. An important requirement to be met in this respect is that the image quality of the image which can be recovered on the basis of the coded image is high. The amount of information per coded image is less important because the transmission rate with which the coded image is to be transmitted need not meet any special requirements.

Attractive coding techniques for coding (compressing) moving-image information are techniques which utilize the redundancy between successive images. A suitable image compression technique is the so-called MPEG image compression, which has been described comprehensively inter alia by D. J. Le Gall in "The MPEG video compression algorithm"; Signal Processing: Image Communication 4 (1992); pp. 129–140; Elsevier Science Publishers B.V. and "MPEG: A video compression standard for multimedia applications"; Communications of the ACM; April 1991, Vol. 34 no. 4, pp. 47–58, said publications being herewith incorporated by reference. Since the redundancy between successive images is high in compression techniques utilizing redundancy a substantial compression factor is attained. As a result of this large compression factor these compression techniques are particularly suitable for recording and reading moving images on/from a record carrier. This makes it possible, in spite of a comparatively low read velocity customary for reading, to read digitized moving-image information rapidly enough to allow a smooth reproduction of the moving-image information to be obtained.

A disadvantage of this compression technique is that for the recovery of an arbitrarily selected image information about a number of different images is required.

This is a disadvantage particularly if it is necessary to read out an arbitrarily selected image for the reproduction of a still image.

A suitable compression technique for the compression of stationary-image information is the MPEG coding technique used for coding so-called "MPEG-INTRA" images. Another suitable compression technique is the so-called "JPEG" coding. Still another suitable coding technique, which is used inter alia in the so-called Photo-CD system, is described in WO 91/08648 and WO 92/05651, which documents are herewith incorporated by reference. The aforementioned compression techniques have lower compression factors that compression techniques which allow for the redundancy between successive images, so that the amount of information per coded image for compression techniques which do not allow for the redundancy between successive images is larger than in the case of compression techniques which allow for this. This means that when an image recorded on a record carrier is read out the time required for reading is comparatively long. However, the image quality is considerably better.

In order to record the data streams the image coding and recording unit 2 further comprises a recording device 7 for recording the first and the second data stream on one and the same record carrier 8. The record carrier may be, for example, of an optical, magnetic or magneto-optical type. Record carriers of an optical or magneto-optical type are preferred owing to their high storage capacity. Although in principle a record carrier in the form of a tape may be used a disc-shaped record carrier is to be preferred because of the inherently short access times in so-called "random access" modes. The recording unit 2 may be of a customary type, for example as described in EP-A-0,507,403 which corresponds to U.S. Pat. No. 5,390,159, which records the data streams on the record carrier in accordance with a customary recording principle and which further comprises the necessary control means for dividing the information streams among files and for adding control files with index data to control the read-out of the various data files. A suitable arrangement of the information in the files will be described in a subsequent part of the description. The recording device further comprises the necessary formatting means for suitably formatting the files. A suitable format is inter alia the format as used for record carriers of the CD-ROM type as defined in the ISO 9660 standard. However, it will be obvious to those skilled in the art that numerous other formats are suitable. The embodiment of the image coding and recording unit 2 uses two separate coding units. It will also be obvious to the expert that instead of two separate coding units it is possible to use one coding unit capable of performing the two required codings. The two coding units can be combined simply, for example, in the case that for the compression of moving-image information the MPEG technique is used and for the coding of the stationary images the MPEG coding for so-called "INTRA" images is used.

By means of the image coding and recording unit 2 two data streams are recorded on the record carrier 8, i.e. a (first) data stream enabling moving-image information being read to be reproduced steadily and a (second) data stream enabling a still image to be reproduced with a high image quality.

For the read-out and recovery of the image information on the record carrier 8 the diagnostic system comprises an image information retrieval unit 9. The image information retrieval unit 9 comprises a read unit 10 of a customary type, for example as described in the afore-mentioned EP-A-0, 507,403, for reading the record carrier with a read velocity for which the bit rate at which the bits of the information stream become available is high enough to ensure a steady reproduction of moving-image information. To apply the first data stream being read and the second data stream being read to a first decoding unit 12 and a second decoding unit 13, respectively, a bus 11 couples the read unit 10 to said first decoding unit 12 and said second decoding unit 13. The decoding unit 12 is of a customary type for recovering the moving-image information from the first data stream in a manner which is the inverse of the coding carried out by the coding unit 4 for moving-image information. The second decoding unit 13 is of a customary type for recovering still-image information from the second data stream in a manner which is the inverse of the coding applied by the coding unit 6. The present embodiment uses two separate decoding units 12 and 13. It will be obvious to the expert that instead of two separate decoding units it is possible to use one decoding unit capable of performing the two required codings, in which case parts of the decoding unit can be used for both decoding operations.

The image information retrieval unit 9 further comprises an image output unit 16 of a customary type adapted to convert the retrieved images into an output image signal, for example a video signal of a customary type suitable for an image reproducing unit 14, for example an image display unit such as a monitor or a television set. The image output unit may comprise, for example, a so-called frame buffer store adapted to store the associated signal values for each pixel of the image to be displayed. Depending on a logic value of a selection signal applied via a signal line 24 the frame buffer store is loaded with the signal values of the pixels of the image information recovered by the decoding unit 12 or with the signal values of the pixels of the image information recovered by the decoding unit 13. The signal values stored in the frame buffer store are read out in a given sequence and converted into the video signal. The output image signal is applied to the image display unit 14 via a signal line 15. For the purpose of controlling the read-out, decoding and supplying the output image signal the image information retrieval unit 9 comprises a control unit 17, which for this purpose is coupled to the read unit 10, the first decoding unit 12, the second decoding unit 13 and the image output unit 16.

The control unit 17 in the present device is of a program-controlled type having a program memory 18 loaded with a suitable program. However, it will be obvious to those skilled in the art that it is likewise possible to use a so-called "hard-wired" circuit in which the control program is defined by the manner in which the various parts of the circuit are interconnected. The control unit 17 can operate in a first mode and in a second mode.

In the first mode a selected part of the recorded first data stream is read, the moving-image information is recovered and the recovered moving-image information is supplied under customary program control.

In a second mode a selected coded image of the second data stream is read, the corresponding still-image information is recovered and the recovered still-image information is supplied under customary program control.

The control unit can be set at option to the first or the second mode in a customary manner via an operating unit 25.

The image information recorded on the record carrier 8 can be displayed on the image display unit 14 for analysis. The user can then set the control unit 17 to the first mode via the operating unit 25 to display moving images of the object to be analyzed on the image display unit 14. If the user wishes to examine a certain fragment of the displayed moving images more closely he can set the control unit 17 to the second mode via the operating unit 25, which for this purpose supplies a "still image" signal to the control unit. Subsequently, the user can select an image of the second data stream which corresponds to the desired fragment in order to display it as a still picture.

It is preferred to take steps in order to facilitate the retrieval from the second data stream of the still image which corresponds to the desired fragment of the moving image. One possibility is to display image numbers together with the moving images on the image display unit 14 during the reproduction of moving images. When the reproduction of moving images is interrupted the display of the image number of the last image of the series recovered from the first data stream may be continued. With the aid of this image number the user can then select the image to be displayed in the second mode as a stationary image.

However, it is preferred to construct the image coding and recording unit in such a manner that it records reference information on the record carrier to indicate for each of the parts where this image has been recorded in the first and the second data stream.

It is then advantageous to add a number of steps to the program in the program memory 18, viz.:

a program step to interrupt the output of successive images recovered from the first data stream, preferably by interruption of the read-out of the first data stream;

a program step to start the search for the reference information;

a program step to determine on the basis of the reference information the part in the second data stream where a coded image is situated which corresponds to the image supplied by the image output unit at the time of interruption of the output of images recovered from the first data stream;

a program step to start the read-out of the specified part of the second data stream;

a program step to cause the supply of an image signal in which the represented image corresponds to the specified read-out part of the second data stream.

For a reliable analysis it is desirable that the image quality of stationary images recovered from the second data stream is substantially equal to the image quality of the images acquired by means of the image acquisition unit 1. This means that for an image acquired by the image acquisition unit 1 and consisting of a matrix of M×N pixels any pixel of the matrix can be recovered from the coded image without or substantially without faults.

After the user has analyzed the displayed still images he can return, via the operating unit 25, to the first mode in which moving images are supplied. For this purpose the operating unit 25 supplies a "moving-image" signal to the control unit 17, which is then set to the second mode in response to the "moving-image" signal.

For the image quality of the moving-image information represented by the first data stream it is important that during steady reproduction it does not differ perceptibly from the moving-image information represented by the image signals supplied by the image acquisition unit 1.

The last-mentioned requirement defines the required data rate with which the first data stream is to be read. Although the attainable compression factor is large the required data rate will be high in comparison with the data rate of the most customary read devices, which means that the read unit 10 in the image information retrieval unit 9 is comparatively expensive.

Since in a large number of situations a satisfactory analysis is possible with a lower image quality it has advantages to record a third data stream in addition to the first and the second data stream, which third data stream represents the moving-image information with a lower quality than the first data stream and in which the amount of information per image is consequently smaller than in the first data stream, which means that for reading this third data stream a lower data rate (read velocity) is adequate. The third data stream can be read by read units which are cheaper than the read units for the first data stream.

To encode the third data stream the image coding and recording unit may be extended with a third coding unit 20 of a type which corresponds to the coding unit 4 but which provides a higher compression factor.

It is also advantageous to record, in addition to the third data stream, a fourth data stream representing still-image information on the record carrier 8. In this fourth data stream the individual images of the series supplied by the image acquisition unit 1 can be represented in the same way as in the second data stream but with a lower image quality. The fourth data stream can be obtained by means of a coding unit which codes the images received from the image acquisition unit 1 in the same way as the coding unit 6 but which provides a higher compression factor. The third and the fourth data stream can be read, recovered and supplied to an image display unit 22 by means of an image information retrieval unit 21. The image information retrieval unit 21 may be similar to the image information retrieval unit 9, the difference being that the bit rate (read velocity) with which the data streams are read is lower and that the decoding units used in the unit 21 perform a decoding which is the inverse of the coding applied by the coding units 20 and 23. The diagnostic system shown in FIG. 1 comprises only one image information retrieval unit (9) with a high bit rate and only one image information retrieval unit (21) with a low bit rate. In practice, the number of image information retrieval units used in conjunction with the image coding and recording unit 2 will often be substantially larger, particularly for medical uses where diagnosis and information transfer are effected by means of the image information retrieval units. Moreover, with such uses recording and reproduction may be effected at locations and instants which differ considerably. By the use of two different types of image information retrieval units, one with a high bit rate in order to obtain an optimally high image quality and one with a low bit rate in order to obtain images of slightly lower quality, it is possible to use the image information retrieval units having high bit rates only in those cases in which an image of optimum image quality is necessary. In the other cases the use of an image information retrieval unit having a lower bit rate is adequate.

It is to be noted that in principle the decoding unit for recovering the image information from the fourth data stream may be omitted in the image information retrieval unit 21. A so-called CD-I player adapted to reproduce so-called "Full Motion Video" is very suitable for use as an image information retrieval unit 21. For further information about such a player reference is made to "IEEE Transactions on Consumer Electronics, Vol. 38, no. 4, November 1992, pp. 910 to 920. If a CD-I player is used in the diagnostic system it is desirable that the image coding and recording unit is loaded with a so-called application program, which is fetched and subsequently recorded in a so-called CD-I file on the record carrier by the recording unit. When the record carrier 8 is read by the CD-I player this application program is read into a program memory of the player. The read-out of the image information by the CD-I player is then controlled by the application program loaded into the program memory. Preferably, the application program is such that access to the files relating to the first and second data streams is not possible under control of the application program.

Figure 2:
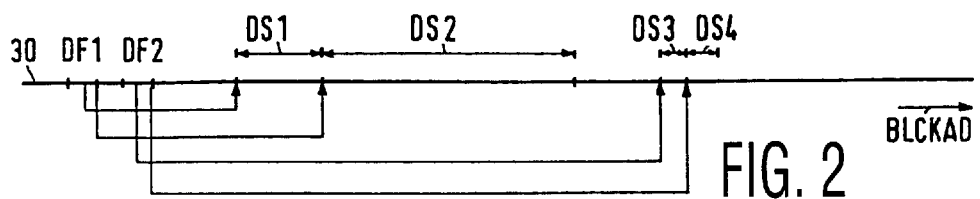
FIGS. 2, 3 and 4 shows suitable layouts of the record carrier on which the data streams have been recorded.

FIG. 2 shows a suitable layout of a track 30 of the record carrier 8 with information files in which the data streams are stored. The recorded information is divided into data blocks (not shown) with an address indicating the location of the data block in the track. In the present layout the positions of the files are shown as a function BLCKAD, which represents an address value of the block address.

The first, the second, the third and the fourth data stream are stored in respective image information files DS1, DS2, DS3 and DS4. The track further includes a first directory file DF1 containing references to the starting addresses of moving-image information files containing the first and second data streams. In the present example these are the image information files DS1 and DS2 but it will be evident that the number of image information files containing the first and the second data stream can be larger than illustrated in FIG. 2.

The track further includes a second directory file DF2 containing references to the starting addresses of the image information files containing the third and the fourth data stream. In the present example these are the image information files DS3 and DS4.

As a result of the use of a separate directory file containing references to the starting addresses of the image information files containing the first and the second data stream and a separate directory file containing references to the starting addresses of the image information files containing the third and the fourth data stream simply it is simple to prevent control programs in the image information retrieval unit from accessing data streams for which no decoding unit is available. In other words, the control programs in the image information retrieval unit 9 should only have access to image files referred to in the directory file DF1. The control programs in the image information retrieval unit 21 should all have access to image files referred to in the directory file DF2.

Figure 3:
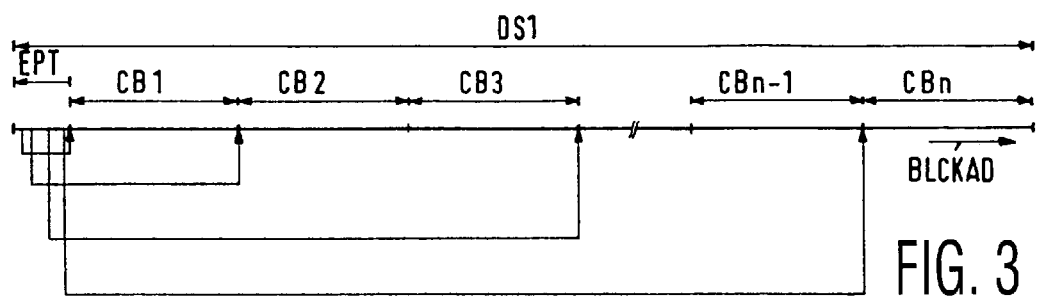

FIG. 3 shows a suitable layout for image files DS1.

It is to be noted that the layout shown in FIG. 3 is suitable for all subfiles in which a first, a second, a third or a fourth data stream has been recorded.

The shown image file DS1 contains a coded image, CB1, CB2, CB3, . . . , CBn-1 and CBn, for each of the series of images represented by the data stream in the relevant image information file. Each coded image contains the coded information derived for each image by the coding unit which has generated the data stream containing the relevant image information file. An image number code specifying the position of the image within the series of successive images is assigned to a number of coded images, preferably those coded images from which a complete still image can be recovered without any further information from other coded images being required. In the case of MPEG coded images an image number code is assigned to each so-called "Intra" image. (From such an "Intra" image a complete image can be derived independently of the other coded images.) An MPEG coded signal may further comprise so-called "Predicted" images. A complete image can be recovered from the combination of a "Predicted" image and an associated "Intra" image. Finally, an MPEG coded image may include so-called "Bidirectional" images. A complete image can then be recovered from the combination of a "Bidirectional" image and the associated "Intra" image and "Predicted" image. The "Predicted" images and the "Bidirectional" images have not been provided with image number codes. The image information file DS1 includes a table EPT containing entry points for the coded images bearing an image number code. Herein, an entry point is to be understood to mean a reference code specifying the beginning of the associated coded image. This can be achieved by including the starting address of the relevant coded image in the entry-point table.

If the image file contains the second data stream and has an entry-point table (EPT) the reference information will include the image number codes in the coded images and the entry-point table in the image file containing the second data stream. When the supply of images recovered from the first data stream is interrupted the image number code of the last image supplied can now be determined in a program step of the program which has been loaded into the program memory. To determine an image number of the supplied images corresponding to the "Predicted" images and, if applicable, the "Bidirectional" images the read device may be provided with an image counter. The count of the image counter is then incremented each time that a subsequent image is supplied. Each time that an image is supplied which has been recovered from a coded image having an image number code (the "Intra" image in the case of MPEG coded images) the image counter can be loaded with the image number defined by the image number code. The image counter is loaded at the beginning of the reproduction of a new series of images as soon as the first coded image having an image number code is recovered. Subsequently, the current image number can be updated by incrementing the count each time that an image is supplied. It is also possible to load the image counter with the image number corresponding to an image number code each time that a coded image having this image number code is recovered.

Figure 5:
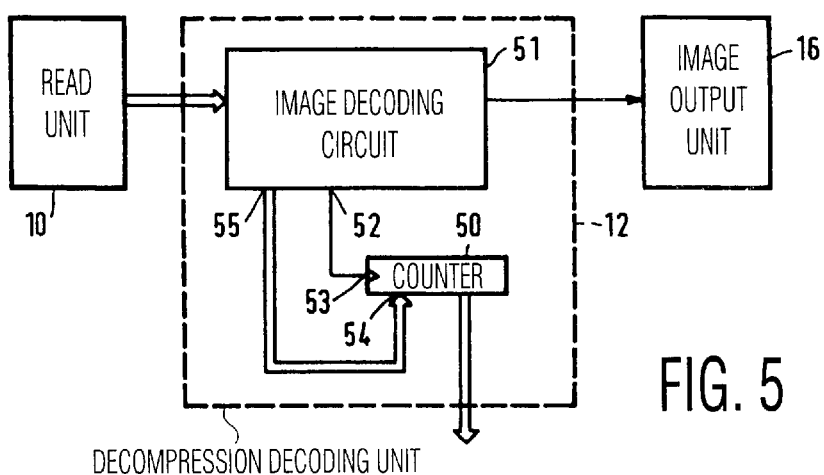
FIG. 5 shows an example of a decoding unit.

FIG. 5 shows an example of the image decoding unit 12 provided with an image counter 50 of the type described above. The image decoding unit 12 further comprises an image decoding circuit 51, for example an MPEG decoding circuit 51. An output 52 of the decoding circuit 51 supplies a counting pulse to a count input 53 of the counter 50 each time that a decoded image is supplied to the image output unit 16. The content of the counter is incremented by a constant value in response to each counting pulse. A load input 54 of the image counter 50 is connected to an output 55 of the image decoding circuit 51 and supplies an image number corresponding to an "Intra" image to this output each time that a decoded image corresponding to this "Intra" image is supplied. The image counter is loaded with this image number when the image number is supplied to the output 55.

Figure 6:
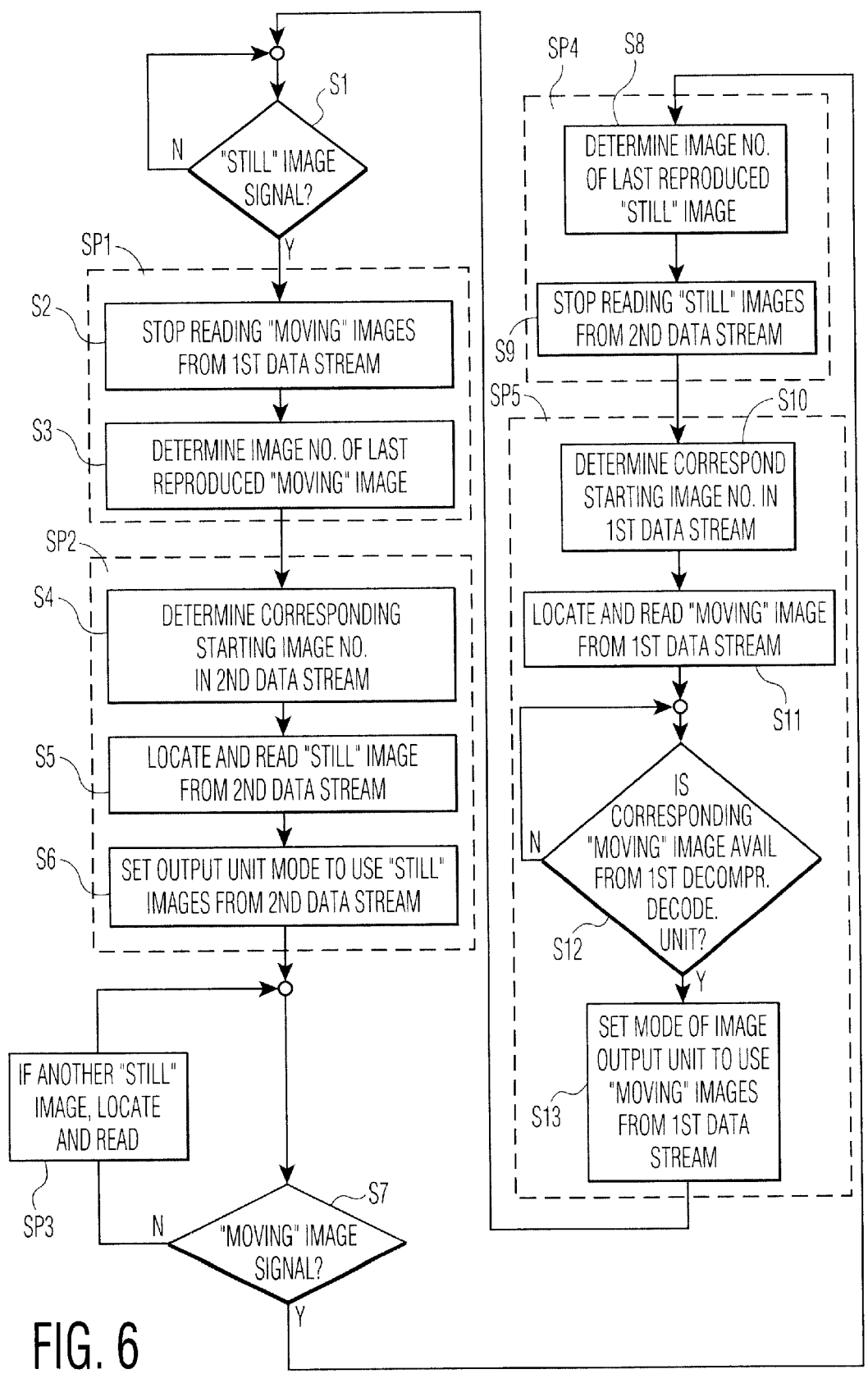
FIG. 6 is a flow chart of a program which can be carried out by a control unit in the diagnostic system in accordance with the invention.

FIG. 6 by way of example shows a flow chart of a program for effecting a change-over from the first mode to the second mode and vice versa. After the read-out of the first data stream from the record carrier has been started the program is in a test loop which comprises a test step S1 which ascertains whether the operating unit 25 supplies the "still image" signal to the control unit 17. This test step is repeated until the "still image" signal is detected. In that case the test step S1 is followed by a subprogram SP1. In the subprogram SP1 the first mode is terminated. The subprogram SP1 comprises a program step S2, in which reading of the first data stream from the record carrier 8 is stopped. After the step S2 has been carried out the image number of the currently supplied image is determined. The image number can be determined by reading out the image counter 54. The subprogram SP1 is followed by a subprogram SP2, in which the control unit 17 is set to the second mode. The subprogram SP2 begins with a step S4. In the step S4 the starting address or image number of the coded image in the second data stream corresponding to the image number in the first data stream thus determined is derived by means of the entry-point table. Subsequently, during a step S5, this coded image in the second data stream is located and read out. After this, in a step S6, the image output unit 16 is set to a mode of operation in which the images recovered by the decoding unit 13 are converted into a corresponding video signal, which is supplied via the signal line 15. The step 16 is the last step of the subprogram SP2. After termination of the subprogram SP2 a test step S7 is carried out to test whether the operating unit 25 supplies the "moving image" signal to the control unit 17. If this is not the case, the step S7 is followed by a subprogram SP3 to check if a subsequent or preceding still image is to be supplied, and if this is the case the desired image is located and read from the record carrier. After completion of the subprogram SP3 the program proceeds with the step S7. The program loop formed by the step S7 and the subprogram SP3 is repeated until the "moving image" signal is detected in the step S7. After detection of the "moving image" signal the step S7 is followed by a subprogram SP4, in which the second mode is discontinued. This subprogram comprises a step S8, in which the image number of the last reproduced still image is determined. Subsequently, reading of the second data stream from the record carrier 8 is stopped in a step S9. The step S9 is the last step of the subprogram SP4. After termination of the subprogram SP4 a subprogram SP5 is carried out, in which the control unit 17 is reset to the first mode. The subprogram SP5 begins with a step S10, in which on the basis of the image number of the last reproduced still image and of the entry-point table EPT the image number is determined of that coded image in the first data stream which contains all the information necessary to recover a complete image and which directly precedes the image in the first data stream which corresponds to the last reproduced still image. Subsequently, during a step S11, the coded image in the first data stream with the image number thus determined is located and the read-out of the first data stream is started. In a subsequent test step S12 it is checked on the basis of the count of the image counter 54 whether the image corresponding to the last reproduced still image is already available on the output of the decoding unit 12. If it is available a step S13 is carried out, in which the image output unit 16 is set to a mode in which the images recovered by the decoding unit 12 are converted into a corresponding video signal, which is supplied via the signal line 15. The step S13 is the last step of the subprogram SP5. After termination of the subprogram SP5 the program proceeds with the step S1.

It is to be noted that upon interruption of the supply of images recovered from the third data stream a still picture corresponding to the image supplied immediately before the interruption can be retrieved from the fourth data stream in a manner similar to that described for retrieving a still image from the second data stream after interruption of the supply of images recovered from the first data stream.

The diagnostic system in accordance with the invention is particularly suitable for use in cardiac diagnosis. During such an examination a contrast medium is introduced into blood vessels of the heart, after which a series of radiographs of the heart is made. In cardiac diagnosis the image information is generally obtained in a number of so called runs. The length of a run is determined by the time required by the contrast medium to propagate in the blood vessels of the heart. This time is of the order of magnitude of ten seconds. With a customary number of 15 to 30 X-ray exposures per second this means that one run consists of approximately 150–300 images. Before a subsequent run can be carried out it is necessary to wait until the contrast medium has disappeared from the blood vessels. This means that a comparatively long time expires between successive runs.

Figure 4:
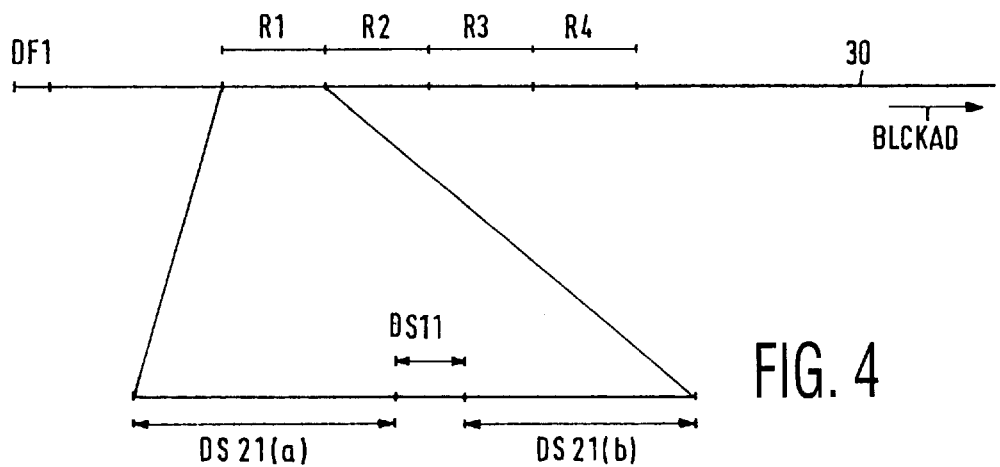

FIG. 4 shows an attractive layout of the track 30 in the case that the images are available in runs. The image information files generated in different runs are recorded in track portions R1, R2, R3 and R4. Each of the track portions contains an image information file for each of the data streams generated on the basis of the images obtained in the run. In the example shown in FIG. 4 each of the track portions R1, R2, R3 and R4 includes two image information files, i.e. one image information file for the first data stream and one image information file for the second data stream. DS11 and DS21 are the image information files for the portion R1. The image information file DS11 contains the first data stream and the image information file DS21 contains the second data stream. The image information file DS21 comprises two subfiles (DS21a and DS21b). The track portion in which the image information file DS11 is recorded is the portion between the portions in which the subfiles DS21a and DS21b are recorded. The image information files in the other runs are recorded in a similar manner. The image information file layout shown in FIG. 4 has the advantage that if during the reproduction of moving-image information this reproduction is interrupted to read a still image to be recovered from the second data stream only a small distance has to be covered to move to the new read location, which results in a short access time.

What is claimed is:

1. A method of recording in coded form on a record carrier image information in the form of a series of images which succeed one another in time, said series of images being converted into first and second data streams in which each image of the series of succeeding images is represented in each of the first and second data streams, which first and second data streams are recorded together on the record carrier, an average amount of information per image of the series in the first data stream being smaller than in the second data stream.

2. A method as claimed in claim 1, characterized in that reference information is recorded on the record carrier, which reference information is indicative of the locations where corresponding images of the series are situated in the first and second data streams.

3. A method as claimed in claim 1, characterized in that the conversion of the series of images into the first data stream is of a type in which images of the series are coded by coding differences between a relevant image and another image of the series, each image in the second data stream being represented by a separately coded image which has been coded independently of the image information of other images of the series.

4. A method as claimed in claim 2, characterized in that the series of images is also converted into a third data stream in which each image of the series is represented, which third data stream is recorded together with the first and second data streams on the record carrier, the average amount of information per image in the third data stream being smaller than in the first data stream.

5. A method as claimed in claim 4, characterized in that the series of images is also converted into a fourth data stream, each image being separately coded independently of the image content of the other images of the series, which fourth data stream is recorded together with the first, second and third data streams on the record carrier, an average amount of information per image in the fourth data stream being smaller than in the second data stream.

6. A method as claimed in claim 4, characterized in that further reference information is recorded on the record carrier, which further reference information for each image of the series indicates parts in the third data stream which are representative of the relevant image.

7. A method as claimed in claim 4, characterized in that on the record carrier an application program is recorded which, after being read, is intended to be loaded into a memory of a control unit of a read device in order to be subsequently used for controlling the read-out of the third data stream, the application program being of a type which prevents at least one of the first and second data streams recorded on the record carrier from being accessed during execution of the program.

8. A method as claimed in claim 7, characterized in that the third data stream is obtained in accordance with an image coding defined in the CD-I standard, and the application program and the third data stream are recorded on the record carrier in a format complying with the CD-I standard.

9. A method as claimed in claim 5, characterized in that the third and fourth data streams are obtained in accordance with an image coding defined in the CD-I standard, and are recorded on the record carrier in a format complying with the CD-I standard.

10. A method as claimed in claim 1, characterized in that the series of images comprises one or more continuous runs and for each continuous run at least the first and the second data streams which have been derived from a same continuous run are recorded in a continuous part of the record carrier.

11. A method as claimed in claim 10, characterized in that for each continuous run of the series of images a first part of the second data stream is recorded in such a way that it directly precedes the first data stream and a second part of the second data stream is recorded in such a way that it directly follows the first data stream.

12. A diagnostic system comprising:
  means for acquiring image information relating to an object to be examined, which image information represents a series of images which succeed one another in time,
  an image coding and recording unit comprising first coding means for converting the series of images which succeed one another in time into a first data stream in which each image of the series of succeeding images is represented, and second coding means for converting the image information into a second data stream in which each image of the series of images is represented likewise, an average amount of information per image in the first data stream being smaller than in the second data stream, and the image coding and recording unit further comprising a recording device for recording the first and second data streams together on a record carrier,
  an image information retrieval unit of a first type comprising read means for reading the record carrier with a first read velocity, first decoding means for recovering successive images from the first data stream, second decoding means for recovering individual images from the second data stream, and image output means for supplying recovered images to an image reproducing device, control means for controlling the read means, the first and the second decoding means and the image output means, which control means are adapted to achieve that in a first mode a part of the recorded first data stream is read, a series of images corresponding to the read-out part is recovered by the first decoding means and said recovered images are supplied by the image output means, and the control means are further adapted to achieve that in a second mode a selected separately coded image of the second data stream is read, an image corresponding thereto is recovered from said coded image by the second decoding means and said recovered image is supplied by the image output means.

13. A system as claimed in claim 12, characterized in that the image information retrieval unit of the first type comprises means for stopping the first mode in response to a control signal and means for starting the second mode, after termination of the first mode, regardless of whether the image which directly precedes the termination of the first mode has been recovered.

14. A system as claimed in claim 12, characterized in that the image coding and recording unit is adapted to effectuate a recording of reference information on the record carrier, which reference information is indicative of the locations of corresponding images in the first and second data streams.

15. A system as claimed in claim 14, characterized in that the image information retrieval unit comprises means for interrupting the supply of succeeding images recovered from the first data stream, means for determining on the basis of the reference information the location in the second data stream where a separately coded image has been recorded, which image is dictated by the position in the series of images of the image supplied by the output means at the time of the interruption of the supply of images recovered from the first data stream, the control means for controlling the read-out being adapted to effectuate reading of the separately coded image at the location thus determined from the recorded second data stream at the location thus determined, and the recovery and the supply of the image corresponding to the image thus read.

16. A system as claimed in claim 12, characterized in that the first coding means are of a type in which images of the series are coded by coding differences between the relevant image and another image of the series, the second coding means being adapted to separately code each image of the series independently of the image content of other images of the series.

17. A system as claimed in claim 12, characterized in that the image coding and recording unit further comprises third coding means for converting the series of images into a third data stream in which each image of the series is represented, the average amount of information per image in the third data stream being smaller than in the first data stream, the recording means being adapted to record the third data stream together with the first and the second data streams on the record carrier, and the system further comprising an image information retrieval unit of a second type comprising second read means for reading the record carrier with a second read velocity, and means for recovering the images from the third data stream thus read, the first read velocity being higher than the second read velocity.

18. A system as claimed in claim 17, characterized in that the image coding and recording unit further comprises fourth coding means for converting all the images of the series into a fourth data stream, each image of the series being coded independently of the image information in images of the remainder of the series, the average amount of information per image in the fourth data stream being smaller than in the second data stream, the recording means being adapted to record the fourth data stream together with the first, the second and the third data streams on the same record carrier, and the image information retrieval unit being of the second type comprising means for recovering the images from the read-out fourth data stream.

19. A system as claimed in claim 18, characterized in that the image coding and recording unit is adapted to effectuate a recording of further reference information on the record carrier, which further reference information is indicative of the locations of corresponding images in the first and second data streams.

20. A system as claimed in claim 17, characterized in that the image coding and recording unit comprises means for recording on the record carrier an application program intended to be loaded, after being read, into a control unit of a read device for the purpose of controlling the read-out of the third data stream, the image information retrieval unit being of the second type comprising read means for reading the application program and subsequently loading the application program into a control unit for controlling the read-out of the third data stream, the application program being of a type which prevents at least one of the first and second data streams recorded on the record carrier from being accessed during execution of the program.

21. A system as claimed in claim 20, characterized in that, in order to obtain the third data stream, the third coding means are adapted to code the images in accordance with an image coding defined in the CD-I standard, and the recording means are adapted to record the application program and the third data stream on the record carrier in a format complying with the CD-I standard, the image information retrieval unit of the second type being a CD-I player.

22. A system as claimed in claim 21, characterized in that, in order to obtain the fourth data stream, the third coding means is adapted to code the images in accordance with an image coding defined in the CD-I standard, and the recording means are adapted to record the application program and the fourth data stream on the record carrier in a format complying with the CD-I standard.

23. A system as claimed in claim 13, in which the means for acquiring image information relating to an object to be examined is adapted to supply the series of succeeding images in one or more continuous runs, the recording means being adapted to record at least the first and the second data streams, which have been derived from a same continuous run, in a continuous part of the record carrier.

24. A system as claimed in claim 23, characterized in that the recording means are adapted to record a first part of the second data stream in such a way that it directly precedes the first data stream and a second part of the second data stream in such a way that it directly follows the first data stream for each continuous run.

25. An image coding and recording unit comprising first coding means for converting a series of images which succeed one another in time into a first data stream in which each image of the series is represented, second coding means for converting the same series of images into a second data stream in which each image of the series is represented likewise, the average amount of information per image in the first data stream being smaller than in the second data stream, and recording means for recording the first data stream together with the second data stream on a record carrier.

26. An image coding and recording unit as claimed in claim 25, characterized in that it is adapted to effectuate a recording of reference information on the record carrier, which reference information is indicative of the locations of corresponding images in the first and second data streams.

27. An image coding and recording unit as claimed in claim 25, characterized in that the first coding means is of a type in which images of the series are coded by coding differences between a relevant image and another image of the series, the second coding means being of a type in which each image is separately coded independently of the image information of other images of the series.

28. An image coding and recording unit as claimed in claim 26, characterized in that the image coding and recording unit further comprises third coding means for converting the series of images into a third data stream in which each image of the series is represented, the average amount of information per image in the third data stream being smaller than in the first data stream, the recording means being adapted to record the third data stream together with the first and second data streams on the record carrier.

29. An image coding and recording unit as claimed in claim 28, characterized in that it further comprises fourth coding means for converting the series of images into a fourth data stream, each of the images of the series being separately coded independently of the image information in the other images of the series, the average amount of information per image in the fourth data stream being smaller than in the second data stream.

30. An image coding and recording unit as claimed in claim 29, characterized in that it is adapted to effectuate a recording of further reference information on the record carrier, which further reference information is indicative of the locations of corresponding images.

31. An image coding and recording unit as claimed in claim 28, characterized in that it comprises means for recording on the record carrier an application program intended to be loaded, after being read, into a control unit of a read device for the purpose of controlling the read-out of the third data stream.

32. An image coding and recording unit as claimed in claim 31, characterized in that, in order to obtain the third data stream, the third coding means is adapted to code the images in accordance with an image coding defined in the CD-I standard, and the recording means is adapted to record the application program and the third data stream on the record carrier in a format complying with the CD-I standard.

33. An image coding and recording unit as claimed in claim 29, characterized in that, in order to obtain the third and fourth data streams, the third and fourth coding means are adapted to code the images in accordance with an image coding defined in the CD-I standard, and the recording means is adapted to record the application program and the third and fourth data streams on the record carrier in a format complying with the CD-I standard.

34. An image coding and recording unit as claimed in claim 29, characterized in that the means for acquiring image information relating to an object to be examined is adapted to supply the series of succeeding images in the form of one or more continuous runs, the recording means being adapted to record at least the third and fourth data streams, which have been derived from a same continuous run in the series of images, in a continuous part of the record carrier.

35. An image coding and recording unit as claimed in claim 34, characterized in that the recording means is adapted to record a first part of the second data stream in such a way that it directly precedes the first data stream and a second part of the second data stream in such a way that it directly follows the first data stream for each continuous series of images.

36. An image information retrieval unit comprising read means for reading a record carrier on which first and second data streams have been recorded, each of the first and second data streams comprising a coded image for each of a same series of images which succeed one another in time, the image information retrieval unit further comprising first decoding means for recovering successive images of the series from the first data stream, second decoding means for recovering individual images of the series from the second data stream, image output means for supplying a recovered image to an image reproducing device, control means for controlling the read means, the first and the second decoding means and the image output means, which control means is adapted to achieve that in a first mode a part of the recorded first data stream is read, a series of images corresponding to the read-out part is recovered by the first decoding means and said recovered images are supplied by the image output means, and the control means is further adapted to achieve that in a second mode a selected separately coded image of the second data stream is read, an image corresponding thereto is recovered from said coded image by the second decoding means and said recovered image is supplied by the image output means, the unit of the further comprising means for stopping the first mode in response to a command signal and means for starting the second mode, after termination of the first mode, regardless of whether the image which directly precedes the termination of the first mode has been recovered.

37. An image information retrieval unit as claimed in claim 36, characterized in that the image information retrieval unit comprises means for interrupting the supply by the image output means of succeeding images recovered from the first data stream, means for determining on the basis of the reference information the location in the second data stream where a separately coded image of the series has been recorded, which image is dictated by the position in the series of the image supplied by the output means at the time of the interruption of the supply of images recovered from the first data stream, the control means for controlling the read-out being adapted to effectuate reading of the separately coded image at the location thus determined from the recorded second data stream at the location thus determined, and the recovery and the supply of the image corresponding to the image thus read.

* * * * *